Oct. 1, 1957  A. J. TUTLE  2,807,884
ADJUSTABLE SINE PLATE
Filed Feb. 17, 1955  2 Sheets-Sheet 1
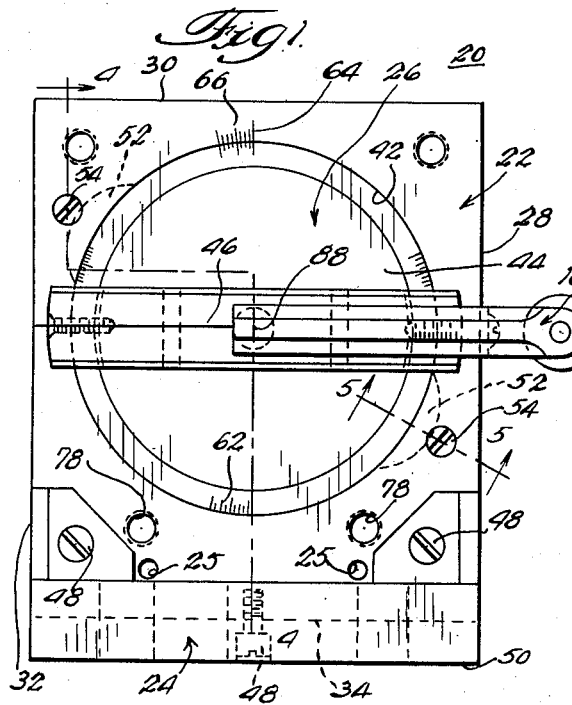
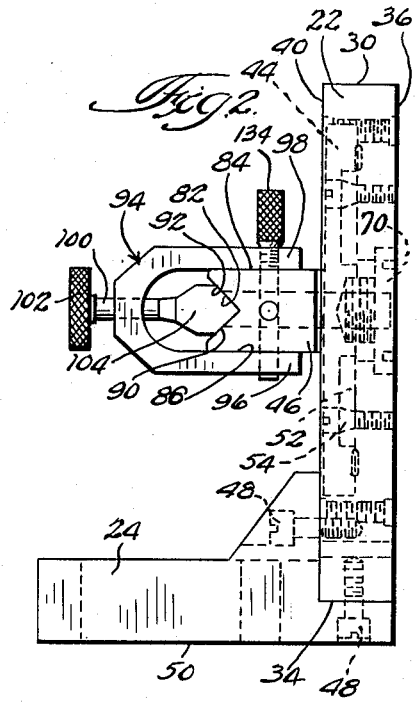
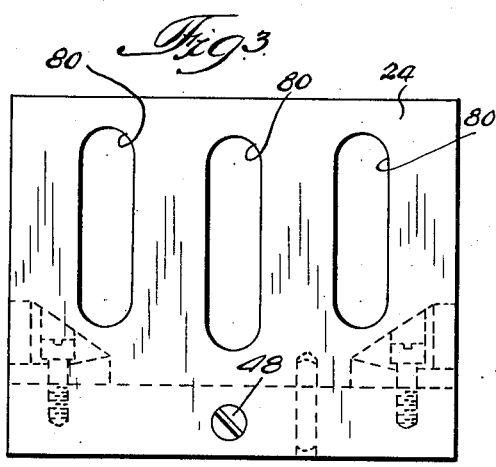
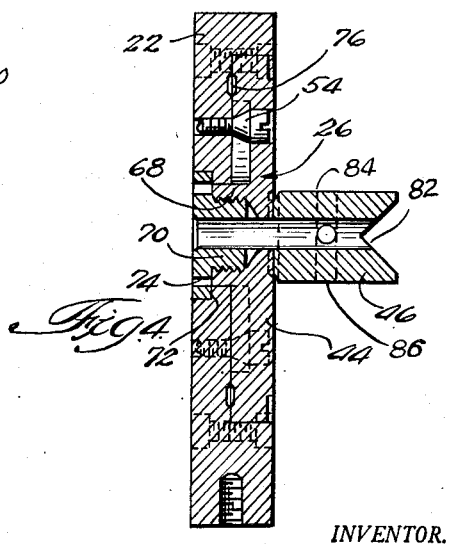
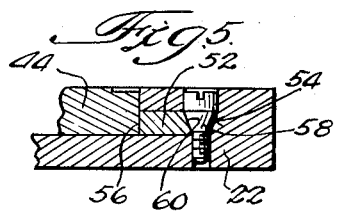
INVENTOR.
Anthony J. Tutle.
BY
Thiess, Olsen, Mecklenburger,
von Holst & Coltman.

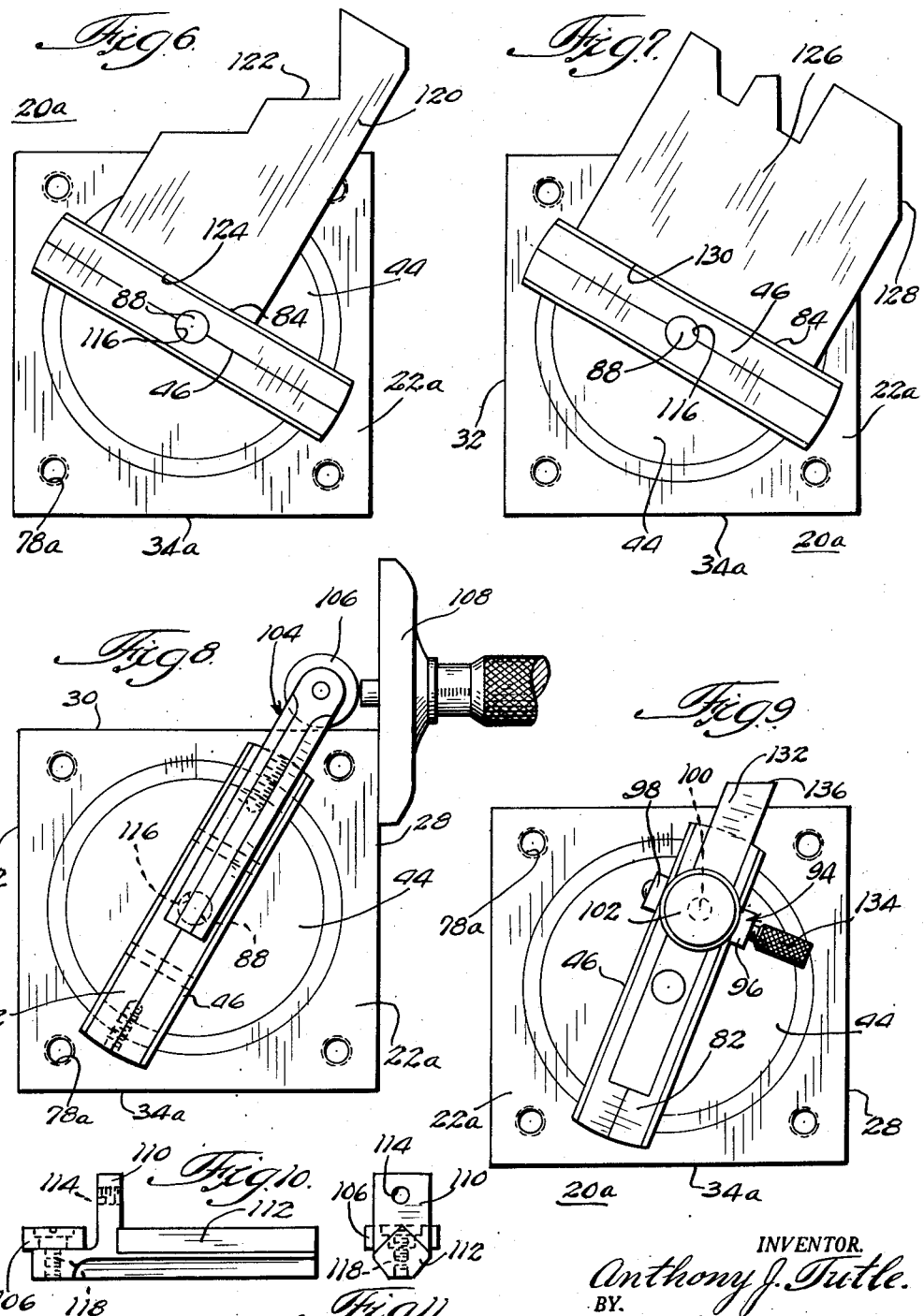

United States Patent Office 2,807,884
Patented Oct. 1, 1957

2,807,884

ADJUSTABLE SINE PLATE

Anthony J. Tutle, Chicago, Ill.

Application February 17, 1955, Serial No. 488,919

2 Claims. (Cl. 33—174)

This invention relates to an adjustable jig or holder for machining, assembly, or measuring and gaging operations. More particularly this invention relates to an improved adjustable sine plate adapted to receive a workpiece in a predetermined fixed angular relationship to a machine bed or the like.

Heretofore various means have been proposed for securing a workpiece to a machine bed for operation thereon by cutting or grinding tools or the like. All such mounting means have been relatively complex, have had a limited number of predetermined positions and angles in which the workpiece could be mounted, were inaccurate and subject to detrimental wear and deterioration and had a plurality of complicated adjustments which were necessary in the preliminary set-up of the device.

It is an object of this invention to provide an improved adjustable sine plate requiring a minimum of measuring and adjusting operations during the set-up thereof.

It is another object of this invention to provide an improved adjustable sine plate requiring a minimum number of parts and having a long useful life requiring little maintenance.

It is still a further object of this invention to provide an improved adjustable sine plate for supporting workpieces in spaced relationship to various cutting and grinding tools which is small and portable, adapted for use on many varied tools and machines, and readily transportable by an operator.

It is still a further object of this invention to provide an improved adjustable sine plate which is calibrated for accurate adjustment by an operator, and which also has means provided for the utilization of auxiliary gaging apparatus of greater accuracy where the ultimate in dimensional control is desired or required.

It is still another object of this invention to provide an improved adjustable sine plate universally adapted to receive substantially all parts normally operated upon by machine tools and adapted for positioning such parts in an infinite number of angular and positional orientations with respect to the operating tool.

It is still another object of this invention to provide an improved adjustable sine plate having rigid positive locking means whereby the operator may accurately control the position of a workpiece located thereon.

Another object of this invention is the provision of a symmetrical adjustable sine plate wherein error is not introduced by the intentional or accidental utilization thereof in various orientations relative to the machine bed or tool. That is, a plurality of equally useful bases are provided.

Further and additional objects of this invention will become obvious from a consideration of this specification, the accompanying drawings and appended claims.

In one form of this invention a rectangular base is provided having four accurately ground straight sides and two parallel surfaces normal to said sides with a cylindrical recess of substantial diameter in one of said surfaces. A work-supporting member is rotatably mounted in the cylindrical recess and has an elongate portion diametrically disposed thereover, said work-supporting member being mounted in said recess in such a manner that the sides of said elongate portion are normal to the surface of the base, parallel, and equidistant from the center of the cylindrical recess. A trough or groove is formed in the outer surface of the elongate portion to receive cylindrical workpieces and also to receive an adapter which forms a part of this invention for the purpose of setting up the sine plate preliminary to a machining operation. A yoke or saddle clamp is mounted on said elongate portion for retaining such cylindrical workpieces and the adapter in fixed relationship on the elongate portion. The term "cylindrical" is not to be limited to right circular cylinders, but may include all cylinder-like bodies falling within the broad definition of that term.

For a more complete understanding of this invention reference will now be made to the accompanying drawings wherein:

Fig. 1 is a front elevational view of one embodiment of this invention with the adapter in place;

Fig. 2 is a side elevation of the embodiment of Fig. 1;

Fig. 3 is a bottom plan view of the embodiment of Fig. 1;

Fig. 4 is a cross sectional view of the embodiment of Fig. 1 taken on the line 4—4 thereof with the transverse support removed;

Fig. 5 is a partial cross sectional view of the embodiment of Fig. 1 taken on the line 5—5 thereof to illustrate the work support locking means;

Fig. 6 is a diagrammatic illustration of a sine plate similar to that shown in Fig. 1 supporting a workpiece for operation thereon by an appropriate tool;

Fig. 7 is a diagrammatic illustration of the embodiment of Fig. 6 with a workpiece mounted thereon for a machining operation on a vertical surface thereof;

Fig. 8 is a diagrammatic illustration of the set-up procedure for the embodiment of Fig. 6 using a depth micrometer and the adapter;

Fig. 9 diagrammatically illustrates the use of the embodiment of Fig. 6 for a machine operation on a cylindrical workpiece;

Fig. 10 is a plan view of the adapter forming a part of the embodiments of Figs. 1 and 6; and Fig. 11 is an end view of the adapter of Fig. 10.

Referring now to the drawings and more particularly to Figs. 1, 2 and 3, one adjustable sine plate 20 is illustrated in which a vertical base 22 has a transverse support 24 secured thereto and a rotatable work supporting member 26 mounted in a cylindrical recess in said base. The base 22 may comprise the entire mounting portion of the invention and the transverse support 24 may be eliminated as illustrated in Figs. 6–9. If such a construction is utilized it is prefererd that the base 22 be a substantially perfect square in which the four sides or edges 28, 30, 32 and 34 are accurately ground to be perpendicular both to one another and to the accurately ground upper and lower base surfaces 36 and 40. Where a transverse support is employed, as is illustrated in Fig. 1, it is considered desirable to have the base 22 of rectangular design with the vertical dimension, when viewed in the position of Figs. 1 and 2, somewhat greater than the transverse or horizontal dimension.

A cylindrical recess 42 is formed in one surface 40 of the base 22 and a cylindrical portion 44 of the work-supporting member 26 is accurately fitted to the cylindrical recess 42. The recess 42 is preferably of substantial diameter approaching the length of one side of the base. A transverse elongate work-supporting portion 46 is integrally connected to the cylindrical portion 44 and lies along a diameter thereof. In the illustrated embodiment the elongate support 46 is integrally formed with the cylinder 44 and accurately machined and ground to the desired dimensions. However, at the option of the mechanic the elongate support 46 may be attached to the cylinder 44 by machine screws and appropriate guide pins. All components of the adjustable sine plate of this invention should be hardened, and subsequently ground to produce the desired accuracy.

The transverse support 24 is secured to the base 22 by a plurality of machine screws 48 and is accurately ground so that the surface 50 of the transverse support 24 will accurately lie in a plane perpendicular to the surface 40 of the base 22. It is important in the construction of a satisfactory jig or work holder that all of the surfaces be accurately machined and lapped for both proper orientation relative to one another and smoothness. However, it is possible for an artisan to maintain these tolerances to within limits far beyond that normally required in machine practice so that any error introduced by the sine plate itself will be negligible in the finished workpiece.

The cylinder 44 is locked in a particular angular orientation in the recess 42 by a unique means including shoes 52 and machine screws 54. The shoes 52 have an arcuate portion which conforms to the periphery of the cylinder 44 and an angular surface engageable by a frusto-conical portion of the machine screw 54. The manner in which the locking means functions will be more clearly seen in Figs. 4 and 5.

Referring particularly to Fig. 5 the shoe 52 is illustrated with the arcuate surface 56 in engagement with a portion of the periphery of cylinder 44. The machine screw 54 is threadably engaged in the base 22 and has a frusto-conical head portion 58 in engagement with an angular surface 60 of the shoe 52. If an operator wishes to position the work-supporting member 26 he normally rotates the machine screw 54 in a counterclockwise manner to withdraw the head thereof from engagement with the angular surface 60. The shoe 52 is thereby freely positioned in the recess provided therefor in base 22 and the cylinder 44 thereby rendered freely rotatable. Upon appropriately positioning the work-supporting member 26 by one of the methods to be described hereinafter, the operator rotates the machine screw 54 in the normal clockwise direction whereby the frusto-conical portion of the head 58 engages the surface 60, forcing the shoe 52 into rigid locking engagement with the cylinder 44.

Indicia 62 are imprinted about the entire periphery of the cylinder 44 although only small portions thereof are illustrated in Fig. 1. These effects may be aligned with indices 64 inscribed in the base 22 adjacent the recess 42 to facilitate the desired angular positioning of the work support 26. In addition to the index 64 a vernier scale 66 may be provided to produce increased accuracy in the set-up as is well understood in the machine arts. For example, if the indicia 62 are in degrees, the vernier scale 66 will permit accurately adjusting the support 26 to within .1°. At least two indices 64 are provided at 90° intervals on the base 22 whereby at least one will always be visible irrespective of the positions of elongate member 46. In addition to the above described indicating means, the work support may be more accurately oriented by using trigonometric principles and an adapter to be described.

The manner in which the work support 26 is rotatably mounted on the base 22 may be seen in Fig. 4. As already described the elongate support 46 is integrally formed with the cylindrical portion 44 and a central hollow internally threaded stud 68 extends therefrom. The threaded stud 68 is adapted to receive a correspondingly threaded locking element 70. The locking element 70 is drawn up against the surfaces of a recess 72 in the base 22 to provide the degree of frictional rotation of the work support 26 which is desired. Control of this friction is facilitated by the provision of a pair of small apertures 74 in the locking element 70 which may be engaged by a spanner wrench or the like. Some form of groove or recess 76 is preferably provided in the engaging faces of the cylinder 44 and the base 22. These functions both to retain a lubricant to facilitate movement of the parts and also to receive small particles which may accumulate in use whereby the surfaces remain flush and the accuracy of the sine plate is maintained. Apertures 25 are accurately drilled in the base 22 to receive pins which align against the surface of support 24 to assure proper positioning of the parts in assembly. Threaded apertures 78 are provided in the base 22 for mounting the sine plate on a machine bed or the like. Elongate slots 80 are similarly provided in the transverse support 24 whereby the sine plate may be mounted with the cylinder 44 in a vertical plane.

The faces 84 and 86 of the elongate support 46 are accurately ground in uniform spaced relationship from the center 88 of both the cylindrical recess 42 and the cylinder 44. Therefore, a workpiece having a flat surface may be placed against either of these surfaces or faces and clamped thereto whereby an operator may be assumed that the workpiece is accurately located with respect to the bed of an associated machine on which either surface 36 of base 22 or the surface 50 of support 24 rests. Therefore, the elongate work support 46 has a trough or groove 82 formed therein to receive cylindrical and cylinder-like workpieces. In operating on cylindrical parts, it is preferred that the workpiece be placed in the trough 82 defined by the planar surfaces 90 and 92 which converge along the center line of elongate member 46. The workpiece is clamped in the trough 82 by a yoke or saddle 94. The saddle 94 has legs 96 and 98 which span the elongate support 46 and a bight portion through which a locking screw 100 threadably extends. The legs 96 and 98 are apertured to receive a mounting pin 134, and the elongate member 46 is correspondingly apertured. The pin 134 and one of the apertures 96 or 98 are preferably threaded to maintain the pin 134 in the desired position. The locking screw 100 has a knurled knob portion 102 which is rotated by an operator to clamp the workpiece between the screw 100 and the trough surfaces 90 and 92.

The saddle 94 and trough 82 are also employed to receive and secure an adapter 104 which is utilized in making highly precise set-ups of the sine plate. The adapter 104 and its use are best illustrated in Fig. 8. Figs. 6–9 illustrate an alternate embodiment differing from the embodiment of Fig. 1 only in the shape of the base. The alternate embodiment has a square base 22a with four threaded apertures 78a therein for mounting purposes. As shown in Fig. 8, the adapter 104 rests in the trough 82 and extends therebeyond with a disc 106 mounted on the free end thereof. The center of disc 106 is accurately located on a diameter of the cylinder 44 parallel to sides 84 and 86 of elongate support 46 and is a predetermined radial distance from the center of said cylinder. The diameter of disc 106 is also accurately determined. Thus, knowing accurately the distance from the center 88 of cylinder 44 to the side 28 of base 22a and knowing accurately the radius of disc 106, the adjustment of the height gage 108 (a portion of which is diagrammatically shown in Fig. 8) will determine the horizontal component of the distance between the center 88 of cylinder 44 and the center of disc 106 is also accurately known. Thus, the operator, having performed the set-up diagrammatically illustrated in Fig. 8, can, by simple trigonometric operations, determine with extreme accuracy the angular disposition of the support 46 relative to any one of the accurately ground sides 28—34 of the base 22a. For example, the distance between center 88 and the center of disc 106 might be 2.0000 inches and the distance from center 88 to side 28 might be 1.5000 inches. The diameter of disc 106 might be .3250 inch and the measurement of height gage 108 in Fig. 8 might be .1750 inch. With this data, it is obvious that the hypotenuse or radial length is 2.0000 inches and the horizontal component is 1.0000 inch. Thus the cosine of the angle formed between the base 34a and the work support 46 is .5 and the angle is 60°.

The saddle 94 will be utilized to clamp the adapter 104 in place and the radial positioning of the adapter will be determined by the engagement of a portion thereof with one end of elongate support 46. As illustrated in Figs. 10 and 11, the adapter has a stud 110 extending transversely from an arm 112 and the stud 110 has a threaded aperture 114 therein. A machine screw may be positioned in the aperture 114 whereby the screw abuts against the end of elongate support 46. This provides an adjustable means for quickly setting up a predetermined problem although generally it is found that the machine screw may be omitted and the stud 110 positioned against the end of support 46, thus always accurately providing the same radial distance between the cylinder center 88 and the center of disc 106. The disc 106, as shown in Fig. 10, is fixed on one end of the adapter arm 112 by a machine screw 118. The positioning of the disc 106 must be accurately controlled as this ultimately determines the accuracy of the entire sine plate.

A central aperture 116 of substantial diameter is provided through which a member may be passed when utilizing the sine plate of this invention for operation with certain work-pieces. For example, in machining the sides of a hexagonal product having a stud extending therefrom, the stud may be passed through the central aperture 116 and rigidly secured therein whereby all of the surfaces of the hexagon may be machined with a single workpiece set-up.

Figs. 6, 7 and 9 illustrate the utilization of the embodiment 20a of this invention diagrammatically. In Fig. 6 it is desired to mount a workpiece 120 with a particular surface 122 disposed vertically and parallel to base 22a for operation thereon by a tool such as a grinder or milling machine. Knowing the angle of the surface 122 relative to the base 124 of the workpiece, this angle is set up by positioning the cylinder 44 at the desired angle relative to the base 22a. Thus the elongate support 46 and more particularly the surface 84 thereof are accurately positioned at the desired angle so that the work piece 120 may be clamped thereto insuring the proper orientation of the surface 122 which is being operated upon. Any conventional form of clamp well known in the machine industry may be employed to secure the workpiece 120 to the sine plate 20. Similarly in Fig. 7 a workpiece 126 is clamped against the surface 84 of elongate support 46. In this illustration however the surfaces are oriented whereby a milling machine or the like is adapted to operate on a vertical surface 128 of the workpiece 126 parallel to the side 32 of base 22a. Therefore, it is necessary to know the angle of the surface 128 relative to the base of the workpiece 130 and to position the cylinder 44 in such a manner that the workpiece 130 may rest firmly against the surface 84 of support 46. The surface 128 is thereby accurately positioned in a vertical plane perpendicular to the side 34a and parallel to side 32.

In Fig. 9 the apparatus of this invention is illustrated in conjunction with a cylindrical workpiece 132. In utilizing the sine plate 20a with a cylindrical workpiece, the workpiece is placed in the trough 82 formed in the top of elongate support 46. The saddle clamp 94 already described is employed for clamping the workpiece in the trough. The saddle clamp is positioned on the elongate member 46 by passing the pin 134 through apertures in the legs 96 and 98 and through the corresponding aperture in the elongate member 46. The machine screw 100 having knob 102, threadably received in the bight portion of yoke 94, is manually operated to rigidly engage the workpiece 132, thus maintaining it in locked position for subsequent operations. Again the specification for the workpiece will determine the angle at which a particular surface 136 should be machined relative to the axis of the cylinder 132. With this information at hand an operator orients the cylinder 44 so that the angle formed between the axis of trough 82 and the side 34a of base 22a corresponds to the desired angle between the workpiece axis and the surface to be machined. Having thus set up the tool the workpiece may be finished in any appropriate machine adapted to operate on vertical surfaces. If the machine is designed to operate on a horizontal surface, as is true of many grinding machines and planers, the sine plate of Fig. 1 having transverse support 24 should be employed in a manner identical to that shown in Figs. 6-9. If, on the contrary, the associated machine is adapted for operation on a vertical surface, the embodiment of Figs. 6-9 might be employed with the base 22a secured against the machine bed.

While the embodiment described above having a base with 3" sides is especially well adapted for use by an individual and for transportation by the individual user from machine to machine and from shop to shop, it should be understood that devices constructed in accordance with this invention may be of various sizes and include many modifications suggested herein depending upon the function of the sine plate. All such modifications and altered constructions are believed clearly to be within the spirit and scope of the invention.

For example, a long, straight-edged extension may be secured to the elongate member 46 to provide a device in the nature of a protractor for very accurate angular determinations.

Without further elaboration, the foregoing will so fully explain the character of my invention that others may, by applying current knowledge, readily adapt the same for use under varying conditions of service, while retaining certain features which may properly be said to constitute the essential items of novelty involved, which items are intended to be defined and secured to me by the following claims.

I claim:

1. An adjustable sine plate comprising a rectangular planar base member having a cylindrical recess in one surface thereof, the center of said cylindrical recess being equidistant from three edges of said base member, a work support having a cylindrical portion of substantially the same diameter as said recess rotatably mounted in said recess and an elongate portion integral with said cylindrical portion and diametrically overlying the center thereof, the longitudinal sides of said elongate portion being parallel, equidistant from the center of said cylindrical portion, and normal to the surface of said base member, the outer surface of said elongate portion defining a plane parallel to the surface of said base member and having a longitudinal work receiving groove therein, said groove being defined by two angularly disposed planar surfaces intersecting along a line parallel to the surface of said base and the longitudinal sides of said elongate portion, an adapter for setting said cylindrical portion at a predetermined angle including an arm secured in said groove, and gaging means having a circular surface mounted on said arm, the axis of said gaging means being mounted normal to the surfaces of said base member and a predetermined distance from the center of said cylindrical portion along a radius parallel to the side of said elongate portion, and means for securing said work support in any predetermined angular position relative to said base member.

2. An adjustable sine plate comprising a rectangular planar base member having a cylindrical recess in one surface thereof, the center of said cylindrical recess being equidistant from three edges of said base member, support means extending from the fourth edge of said base member and defining a planar surface normal to the surfaces of said base member, a work support having a cylindrical portion of substantially the same diameter as said recess rotatably mounted in said recess and an elongate portion integral with said cylindrical portion and diametrically overlying the center thereof, the longitudinal sides of said elongate portion being parallel, equidistant from the center of said cylindrical portion, and normal to the surface of said base member, the outer surface of said elongate portion defining a plane parallel to the surface of said base member and having a longitudinal work receiving groove therein, said groove being defined by two angularly disposed planar surfaces intersecting along a line parallel to the surface of said base and the longitudinal sides of said elongate portion, an adapter for setting said cylindrical portion at a predetermined angle including an arm secured in said groove, and gaging means having a circular surface mounted on said arm, the axis of said gaging means being mounted normal to the surfaces of said base member and a predetermined distance from the center of said cylindrical portion along a radius parallel to the side of said elongate portion, and means for securing said work support in any predetermined angular position relative to said base member.

References Cited in the file of this patent

UNITED STATES PATENTS

| | | |
|---|---|---|
| 292,927 | Lipe | Feb. 5, 1884 |
| 989,893 | Brick | Apr. 18, 1911 |
| 1,256,794 | Hanton | Feb. 19, 1918 |
| 1,366,396 | Loeffler | Jan. 25, 1921 |
| 2,269,814 | Gibson | Jan. 13, 1942 |
| 2,285,741 | Meyer | June 9, 1942 |
| 2,343,637 | Bochenek | Mar. 7, 1944 |
| 2,369,425 | Becker | Feb. 13, 1945 |
| 2,406,515 | Studler | Aug. 27, 1946 |
| 2,406,906 | Saunders | Sept. 3, 1946 |
| 2,498,867 | Trefz | Feb. 28, 1950 |
| 2,501,148 | Weis | Mar. 21, 1950 |
| 2,565,924 | Kraft | Aug. 28, 1951 |

OTHER REFERENCES

American Machinist, p. 146, July 19, 1945.